US008062762B2

(12) United States Patent
Stalter

(10) Patent No.: US 8,062,762 B2
(45) Date of Patent: Nov. 22, 2011

(54) LIGHT-WEIGHT PAULOWINA BASED PLYWOOD

(75) Inventor: William Francis Stalter, Pittsburgh, PA (US)

(73) Assignee: East Coast Lumber Company, Pittsburgh, PA (US)

( * ) Notice: Subject to any disclaimer, the term of this patent is extended or adjusted under 35 U.S.C. 154(b) by 3 days.

(21) Appl. No.: 12/396,423

(22) Filed: Mar. 2, 2009

(65) Prior Publication Data

US 2009/0218249 A1    Sep. 3, 2009

Related U.S. Application Data

(60) Provisional application No. 61/032,549, filed on Feb. 29, 2008.

(51) Int. Cl.
*B32B 5/06*    (2006.01)
(52) U.S. Cl. .................... 428/528; 428/535; 428/537.1; 52/748.1
(58) Field of Classification Search .................. 428/528, 428/535, 537.1; 52/748.1
See application file for complete search history.

(56) References Cited

U.S. PATENT DOCUMENTS

| 5,040,582 | A | * | 8/1991 | Hsu ............................... 144/348 |
| 5,234,747 | A | * | 8/1993 | Walser et al. .................. 428/215 |
| 7,261,947 | B2 | * | 8/2007 | Reichwein et al. ........ 428/537.1 |
| 2006/0166025 | A1 | | 7/2006 | Huang |
| 2007/0125446 | A1 | | 6/2007 | Pasha et al. |

* cited by examiner

*Primary Examiner* — Leszek Kiliman
(74) *Attorney, Agent, or Firm* — Blynn L. Shideler; Krisanne Shideler; BLK Law Group

(57) ABSTRACT

A plywood comprising plys of Paulowina wood combined with plys of other hardwoods. The resulting Paulowina based plywood panels are lightweight, approximately 40% lighter than ordinary plywood. This reduction in weight when used for construction of Recreational vehicles (RV's), Campers, Tractor-trailer box sides, Ocean Shipping boxes, Crates, and Steamer trunks will reduce associated fuel consumption by reducing the overall weight of the cargo, and can lower employee related injury. The resulting Paulowina based plywood panels will reduce work place injury (lower back pain, herniated disks, hernia, etc.) resulting in lower healthcare premiums for both employees and employers. The shipping industry that supply cargo shipping boxes also demand that a lightweight construction material be used for goods that are sent by air cargo, land cargo, rail, and sea cargo in order to conserve energy and the Paulowina based plywood panels are well suited for these applications.

20 Claims, 2 Drawing Sheets

LIGHT-WEIGHT PAULOWINA BASED PLYWOOD

RELATED APPLICATIONS

The present application claims the benefit of U.S. Provisional Patent application Ser. No. 61/032,549 filed Feb. 29, 2008 entitled "Light-Weight Paulowina Based Plywood."

BACKGROUND OF THE INVENTION

1. Field of the Invention

The present invention relates to light-weight plywood constructions, more particularly the present invention relates to Paulowina based plywood constructions.

2. Background Information

Plywood is a wood product manufactured out of many sheets of veneer, or plies, pressed together and glued, with their grains typically going in opposite directions. Plywood tends to be extremely strong, though often not very attractive. Plywood is treated in many different ways depending upon its intended application. Plywood, due to the manner which it is constructed, also tends to resist cracking, bending, warping, and shrinkage, depending upon its thickness. Plywood is also referred to as an engineered wood, although it is made from a composite of wooden materials, and various forms of it have been made for thousands of years. Plywood structures have also been referenced as laminated veneer lumber or LVL in some of the literature.

The plies that form plywood are generally cut on a rotary lathe, which cuts a continuous roll of wood while a log, called a peeler, is turned against it. Rotary lathing is rapid and makes efficient use of the wood while turning out veneers highly suitable for plywood. Some lathes are designed to expose more interesting parts of the wood grain, although they may be more wasteful of the wood. Rotary lathed veneers tend to be dull in appearance, although perfectly functional. After the veneers are cut, they are overlaid with layers of glue and pressed together until dry to form a flat, even, tight piece of plywood. Plywood is sturdier than regular sheets or panels of wood, because the veneers are laid with their grains opposing, which also causes the wood product to resist warping because the grains pull each other tight.

Plywood comes in a number of forms, including softwood plywood, which is made from pine, fir, or spruce. For example, commercial plywood has been made from rotary-peeled Douglas-fir veneers and from Southern yellow pine veneers. Softwood plywood is usually pale in color and is used in construction applications.

As a point of reference, many people are familiar with the concepts of hardwood and softwood. However, few people know why woods are split into these two categories, and make the assumption that hardwoods are hard, while softwood is soft. This distinction is incorrect: balsa wood, for example, is classified as a hardwood despite the fact that it is very soft and light.

Softwood and hardwood are actually distinguished botanically, not by their end use or appearance. In general, hardwood comes from a deciduous tree which loses its leaves annually, and softwood comes from a conifer, which usually remains evergreen. Hardwoods tend to be slower growing, and are therefore usually more dense, but not always.

Hardwoods is a very extensive listing and a non-exclusive list includes Alder, Applewood, Ash, Aspen, Balsa, Basswood, Beech, Birch, Blackbean, Blackwood, Bocote, Boxwood, Brazilwood, Bubing a, Buckeye, Butternut, Carapa, Catalpa, Cherry, Chestnut, Coachwood, Cocobolo, Corkwood, Cottonwood, Dogwood, Ebony, Elm, Eucalyptus, Greenheart, Grenadilla, Gum, Hickory, Hornbeam, Hophornbeam, Ipe, Iroke, Ironwood, Brazilian Rosewood, Jatoba, lacewood, Laurel, Limba, Lignum Vitae, Locust, Mahogany, Maple, Meranti, Merawan, Mpingo, Oak, Obeche, Okoume, Paulownia Pear, Poplar, Ramin, Redcedar, Rosewood, Sal, Sapale Sandalwood, Sassafras, Satinwood, Silver Wattle, Snakewood, Sourwood, Spanish Cedar, Sycamore, Teak, Walnut, Willow and Yellow Poplar. More exotic hardwoods also exist. Many of these are available as commercial hardwoods.

Softwood usually grows in huge tracts of trees which may spread for miles, while hardwoods tend to be found mixed with a variety of other species. Some examples of softwood include pine, redwood, fir, cedar, and larch.

Returning to the topic of plywood, mahogany or birch are used to create an extremely strong type of plywood known as aircraft plywood, because it was utilized in the construction of aircraft through the Second World War.

If plywood is destined for indoor use, it is conventionally made with urea-formaldehyde glue, which dries quickly and is inexpensive. For plywood intended for use in outdoor applications or wet environments, a more expensive water resistant glue is used to prevent the plies from coming apart, or delaminating, and compromising the strength of the plywood.

Plies typically range in thickness depending upon the plywood panels they are used in, from 1/10 inch (approximately 1/5 centimeter) to 1/8 inch (almost 1/3 centimeters). Standard plywood sizes consist of four foot by eight foot (1.2 by 2.4 meter) sheets in three, five, or seven plies. The end user can cut, reshape, or sand these sheets to needed specifications.

Most plywood is made using the same species of wood. However, U.S. Pat. No. 5,040,582 discloses a multi species laminated veneer lumber (a specialty plywood used for lumber manufacture), as well as laminated veneer lumber made from the combination of hardwoods and softwoods. This teaching notes the difference in shrinkage and expansion between the different wood species, particularly between high and low density wood species. This reference teaches that the species sequence from face to core must be identical or very similar on either side of the center ply when an odd number of plies are used or on either side of the center line when an even number of plies are used.

U.S. Pat. No. 5,234,747 teaches a symmetrical lay-up of, from top to bottom, multiple plies of a low density, 6% to 15% moisture content spruce, multiple plies of a high density, less than 5% moisture content Douglas fir, and multiple plies of a low density, 6% to 15% moisture content spruce.

U.S. Pat. No. 7,261,947 discloses a plywood laminate having dimensional stability and resistance to warping and delamination is formed from a plurality of higher quality plies and a plurality of lower quality plies. The higher quality plies may be of hardwood and the lower quality plies may be of softwood or lower quality hardwoods, or the higher quality plies may have a veneer grade of better than ANSI/HPVA HP-1-2000 veneer grade C and the lower quality plies may have a veneer grade of no greater than ANSI/HPVA HP-1-2000 veneer grade C.

U.S. Patent Publication 2007-0125446 teaches a method of producing a fireproof plywood from perennial grasses, such as *Arundo donax* Ligneous, various bamboo strains, or a blend thereof, by first weaving the stalks of these plants into a mat and then layering these mats and binding each layer with any one of several commercial resins mixed with potash for the purpose of enhancing the final product's fire retardant quality.

U.S. Patent Publication 2007-0125446 teaches a plywood composed of several layers of carbon fabrics and veneers which are symmetrically placed within the plywood, where a hot-melt adhesive is used to adhere the adjacent layers. Further, a suitably high temperature and high pressure are provided at the same time to melt the hot-melt adhesive and make the carbon fabrics and veneers adhere tightly. This plywood composed by carbon fabrics and veneers has a higher toughness and thinner thickness compared with conventional plywood.

The increase in energy, e.g., gasoline prices, has brought a demand from the producers and manufacturers of Recreational vehicles, campers, shipping container, boats, trucking companies, kitchens, cabinet makers and any other industry that needs to reduce the shipping budget by reducing their overall gasoline or fuel consumption. Further, the kitchen/bathroom cabinetry industry is also in need of a lightweight construction material to be used for such products as items as cabinets, bay/bow windows, speaker boxes, coffins, furniture, and bookshelves. These industries have relied heavily on plywood constructions. There remains a need in the art to for a light-weight plywood for such applications.

SUMMARY OF THE INVENTION

Some of the above objects are achieved with a plywood comprising plys of Paulowina wood combined with plys of other hardwoods. Paulownia is an extremely fast-growing, soft hardwood native to China, predominantly plantation grown. The heartwood is light in color and its appearance closely resembles American Ash. The wood is straight grained and lustrous. Paulownia is surprisingly light in weight for a hardwood. In fact the physical weight is slightly less than kiln dried western red cedar. It is low in overall strength, but has high strength to weight ratio—physically it ranks between balsa and poplar. The wood dries rapidly and does not easily warp, cup, end check, splinter or split and has a very small shrinkage coefficient.

Paulowina is also fire resistant. The University of Texas labeled Paulowina wood fire-resistant up to a flashpoint of 477°. Consequently the Paulowina based plywood of the present invention provides greater fire resistance than more conventional plywood. The fire resistant trait is particularly beneficial in boats, aircraft and mobile homes where fires can be even more catastrophic in the resulting consequences. In these environments fires have a greater chance of resulting in fatalities and minimizing the spread of a fire is even more beneficial than in other areas.

The other hardwoods of the plywood assembly of the present invention may be selected from the group consisting of Popular, Oak, Meranti and Birch. The plywood may be a veneer core plywood manufactured using alternating plys of Paulowina wood veneer, and other hardwood veneers such as: Poplar; Oak; Meranti: Birch, etc. The plywood can be manufactured in any thickness from about 2.7 mm to 32 mm.

The plywood may utilize "E-0" Formaldehyde free glue, wherein E-0 is a measure of the formaldehyde emitted by the glue. E-0 formaldehyde fee adhesive or glue is available from several manufacturers and is generally considered a far more environmentally friendly adhesive than conventional urea-formaldehyde formulations.

The resulting Paulowina based plywood panels according to the present invention are lightweight, approximately 40% lighter than ordinary plywood. This reduction in weight when used for construction of Recreational vehicles (RV's), Campers, Tractor-trailer box sides, Ocean Shipping boxes, Crates, and Steamer trunks will reduce associated fuel consumption by reducing the overall weight of the cargo, and can lower employee related injury.

The resulting Paulowina based plywood panels according to the present invention will reduce work place injury (lower back pain, herniated disks, hernia, etc.) resulting in lower healthcare premiums for both employees and employers.

The shipping industry that supply cargo shipping boxes also demand that a lightweight construction material be used for goods that are sent by air cargo, land cargo, rail, and sea cargo in order to conserve energy and the Paulowina based plywood panels according to the present invention is well suited for these applications.

The lightweight plywood according to the present invention can also be used as a substrate to laminate Formica type countertops, High Pressure Laminates (HPL) and vineal coverings. The plywood of the present invention will also accept a UV coating very well.

These and other advantages of the present invention will be clarified in the description of the preferred embodiments taken together with the attached drawings in which like reference numerals represent like elements throughout.

DESCRIPTION OF THE PREFERRED EMBODIMENTS

Figure 1:
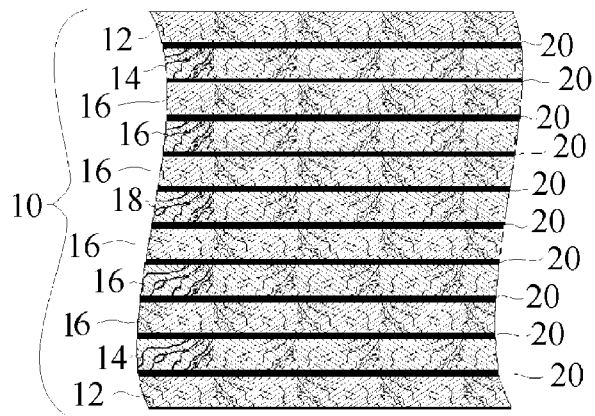
FIG. 1 is an enlarged schematic view of a Paulowina based plywood construction according to one illustrative non-limiting embodiment of the present invention.

FIG. 1 is an enlarged schematic view of a Paulowina based plywood construction 10, also called an assembly or panel 10, according to one illustrative non-limiting embodiment of the present invention.

The construction, or assembly or panel, 10 can be formed of any conventional size such as 18 mm×1220×2440 mm, and utilized 6 plys of Paulowina veneer 16 and 3 plys of poplar veneer at 14 and 18. Specifically the construction of the panel 10 is one face or front veneer 12 (BB Grade) formed of one of Meranti, Merawan, Birch, Red Oak, Sapele, or Maple. The face veneer 12 is glued using a "0" Formaldehyde Emission Glue 20, also called an E-0 Formaldehyde Emission Glue (E-0 Adhesive), to a top Poplar veneer 14.

The top Poplar veneer 14 is coupled with E-0 adhesive 20 to a section of three Paulowina veneers 16, each coupled together with E-0 adhesive 20. The third Paulowina veneer 16 is coupled with E-0 adhesive 20 to a center Poplar veneer 18. The center Poplar veneer 18 is coupled with E-0 adhesive 20 to a second section of three Paulowina veneers 16, each coupled together with E-0 adhesive 20. The third Paulowina veneer 16 of this second section is coupled with E-0 adhesive 20 to a bottom Poplar veneer 14. The bottom Poplar veneer 14 is coupled with E-0 adhesive 20 to a back veneer 12. The back veneer 12 (BB Grade), like the front veneer 12, is formed of one of Meranti, Merawan, Birch, Red Oak, Sapele, or Maple.

The calibrated panel to Thickness tolerance is about 18 mm: "+0.0 mm/−0.3 mm." There is no putty patch or repairs and the moisture content is about 10%.

The resulting Paulowina based plywood panels 10 according to the present invention as shown in FIG. 1 is a balanced panel 10 and is 40% lighter than similar ordinary plywood. This reduction in weight when used for construction of Recreational vehicles (RV's), Campers, Tractor-trailer box sides, Ocean Shipping boxes, Crates, and Steamer trunks will reduce associated fuel consumption by reducing the overall weight of the cargo, and can lower employee related injury.

The resulting Paulowina based plywood panels 10 according to the present invention will reduce work place injury (lower back pain, herniated disks, hernia, etc.) resulting in lower healthcare premiums for both employees and employers.

The shipping industry that supply cargo shipping boxes also demand that a lightweight construction material be used for goods that are sent by air cargo, land cargo, rail, and sea cargo in order to conserve energy and the Paulowina based plywood panels 10 according to the present invention is well suited for these applications.

Figure 2:
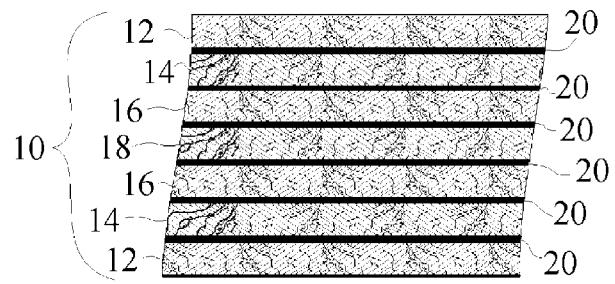
FIG. 2 is an enlarged schematic view of a Paulowina based plywood construction according to a second illustrative non-limiting embodiment of the present invention.

FIG. 2 is an enlarged schematic view of a Paulowina based balanced plywood panel 30 according to one illustrative non-limiting embodiment of the present invention. The Balanced panel 30 is formed with a ply of a designated hardwood such as poplar, birch, maple, oak, Meranti or other hardwood veneer followed by one ply of Paulowina veneer alternating each ply until the desired thickness of the panel is reached in a balanced panel assembly 30.

Specifically the construction of the panel 30 is one face or front veneer 12 (BB Grade) formed of one of Meranti, Merawan, Birch, Red Oak, Sapele, or Maple. The face veneer 12 is glued using an E-0 Adhesive 20 to a top Poplar veneer 14.

The top Poplar veneer 14 is coupled with E-0 adhesive 20 to a Paulowina veneer 16. The Paulowina veneer 16 is coupled with E-0 adhesive 20 to a center Poplar veneer 18. The center Poplar veneer 18 is coupled with E-0 adhesive 20 to a second Paulowina veneer 16. The second Paulowina veneer 16 is coupled with E-0 adhesive 20 to a bottom Poplar veneer 14. The bottom Poplar veneer 14 is coupled with E-0 adhesive 20 to a back veneer 12. The back veneer 12 (BB Grade), like the front veneer 12, is formed of one of Meranti, Merawan, Birch, Red Oak, Sapele, or Maple.

The resulting Paulowina based plywood panels 30 according to the present invention as shown in FIG. 2 is a balanced panel 30 and, like panel 10, is lighter than ordinary plywood. This reduction in weight when used for construction of Recreational vehicles (RV's), Campers, Tractor-trailer box sides, Ocean Shipping boxes, Crates, and Steamer trunks will reduce associated fuel consumption by reducing the overall weight of the cargo, and can lower employee related injury.

The resulting Paulowina based plywood panels 30, similar to panels 10, will reduce work place injury (lower back pain, herniated disks, hernia, etc.) resulting in lower healthcare premiums for both employees and employers.

The Paulowina based plywood panels 30, like panels 10, are well suited for shipping applications.

In addition to the energy savings and the associated decrease in workplace injuries, The Paulowina based panels provide a number of distinct environmental advantages over existing plywood. Paulowina is an extremely fast growing tree and, as such, is a much more renewable resource than alternative woods. The use of Paulowina is thus far more eco-friendly than slower growth hardwoods. Further the construction allows for the use of E-0 adhesives 20 which results in lower (zero) formaldehyde emissions of the resulting panels 10 or 30. The resulting panels satisfy CARB1 and CARB2 standards, which relates to California Air Resources Board's (CARB) composite wood ACTM (Air Toxics Control Measure) that set formaldehyde emissions limits for particular wood products. The use of the Paulowina veneers 16 is partly responsible for the ability to use such adhesives as these veneers easily accommodate such glues.

An alternative within the scope of the present invention is the use of WBP glue as adhesive 20 particularly for marine applications. WBP stands for "Water Boiled Proof" and the use of an approved WBP glue for the plywood/film faced plywood, will allow that the panel will can be exposed to weather, water and moisture for a long period (some maybe permanently) without delaminating.

Another embodiment of the present invention provides a plywood with a top veneer of hardwood, such as birch, oak, maple, cherry or HPL with intermediate layers of 1-30 separate layers of Paulowina and an opposed bottom layer of hardwood similar to the top, wherein the number of intermediate layers is selected to control the final density of the panel.

Samples of the present invention were prepared for testing. Specifically an 11 ply version using polar and paulina layers with birch facing were used in the testing. The sample panels were 0.586-0.596" thick with a measured density of 19.7-22.1 lbs/ft3. The samples underwent a ASTM D4033 Bending test and exhibited Max Load of 131-160 Lbs/ft, MOR of 2,853-4,165 psi and MOE of 0.450-562 psi. The samples exhibited an average Janka Ball Hardness of 362 lbf (ASTM D 1037). The samples exhibited an Internal Bond result of 192-296 Load (LBS) and strength of 48-74 psi. The samples exhibited a screw withdrawal value of 184 face average and 171 edge average (LBF).

The applicants have worked with a number of Chinese manufacturers to develop and test a number of plywood types of the present invention. Since the development by the applicants, several of these manufacturers have added the panels of the present invention to their inventory of commercial products, however these currently available products are believed to be the applicants development or derivatives thereof from the applicants work with these Chinese manufacturers. In the United States it is available from the applicant under the trademarks EX2-LITE® and REALLY-LITE™ which were first commercialized Mar. 3, 2008.

Figure 3:
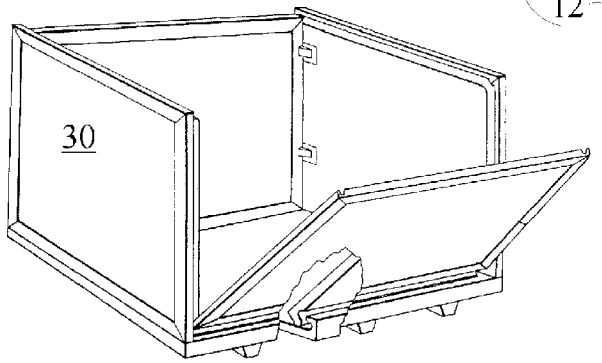
FIG. 3 is a schematic perspective view of a shipping container formed using a Paulowina based plywood construction according to the present invention.

FIG. 3 is a schematic perspective view of a shipping container formed using a Paulowina based plywood construction 30 or 10 according to the present invention. This represents a non-structural application that is particularly well suited for the use of the present invention. The lighter weight will reduce shipping costs and overall energy uses. The rapid growth aspect of this hardwood makes it a more easily renewed resource. The fire proof nature of the panel 10 is further advantageous on marine and aircraft where such properties are particularly beneficial.

Figure 4:
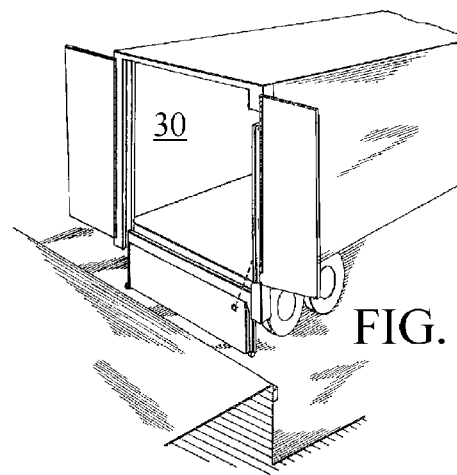
FIG. 4 is a schematic perspective view of a shipping trailer enclosure formed using a Paulowina based plywood construction according to the present invention.

FIG. 4 is a schematic perspective view of a shipping trailer enclosure formed using a Paulowina based plywood construction 30 or 10 according to the present invention. In such a construction an outer metal (aluminum) shell or facing is applied to complete the panel 10 or 30. The main advantage here is the lightweight construction for energy savings for the truck (e.g. less weight means less fuel usage).

Figure 5:
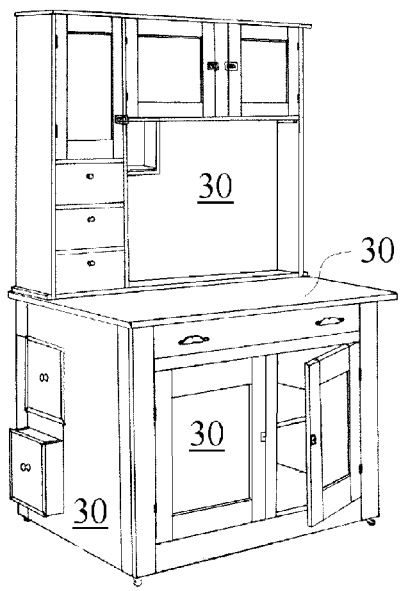
FIG. 5 is a schematic perspective view of a cabinet and countertop formed using a Paulowina based plywood construction according to the present invention.

FIG. 5 is a schematic perspective view of a cabinet and countertop formed using a Paulowina based plywood construction panels 10 or 30 according to the present invention. The panels 10 or 30 can form the cabinet bodies, doors and countertop. Appropriate hardwood outer-facing is used for the cabinet panels and doors whereas a formica or other similar top is used for the countertop construction. The light weight construction will save on shipping of the cabinet in all applications, however it is particularly beneficial for use as cabinetry in vehicles such as RVs, boats, airplanes, trailers and the like where the fuel savings is carried forward in use of the cabinets. As a representative example NASCAR® trailers have been refitted with cabinets made in accordance with the present invention and the savings have allowed the trailer to accommodate an entire extra engine due to the weight savings. The cabinets are considered as nonstructural applications as opposed to floor or weight supporting wall members.

Figure 6:
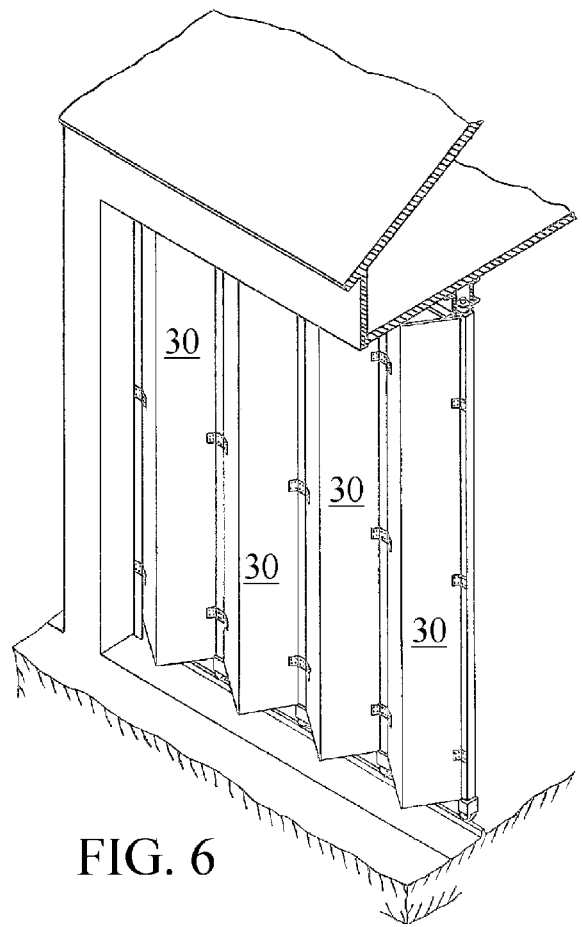
FIG. 6 is a schematic perspective view of a divider formed using a Paulowina based plywood construction according to the present invention.
Figure 8:
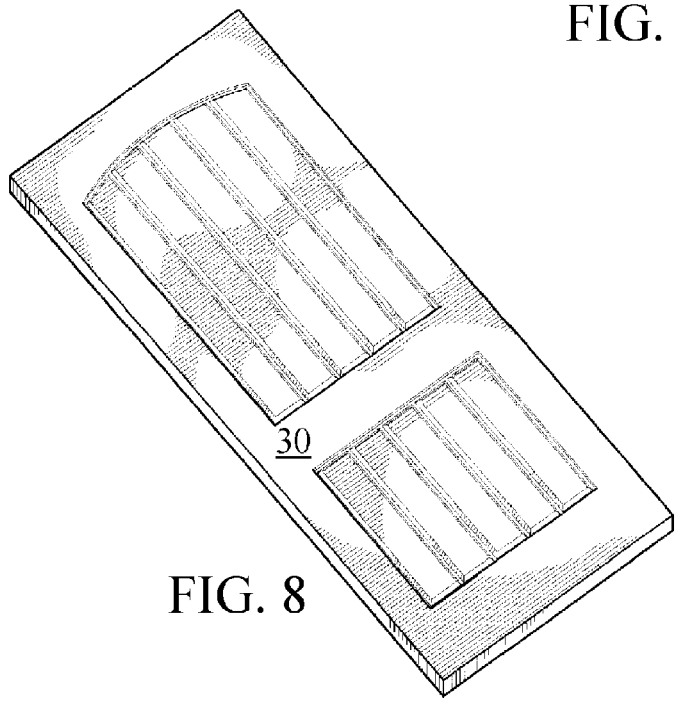
FIG. 8 is a schematic perspective view of a door panel formed using a Paulowina based plywood construction according to the present invention.

FIG. 6 is a schematic perspective view of a divider formed using a Paulowina based plywood construction panels 10 or 30 according to the present invention. In a similar fashion, FIG. 8 is a schematic perspective view of a door panel formed using a Paulowina based plywood construction according to the present invention. These are representative illustrations of further nonstructural applications of the present invention.

Figure 7:
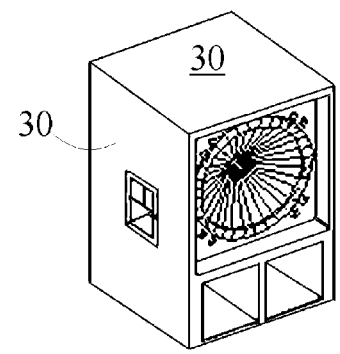
FIG. 7 is a schematic perspective view of an acoustic speaker enclosure formed using a Paulowina based plywood construction according to the present invention.

FIG. 7 is a schematic perspective view of an acoustic speaker enclosure formed using a Paulowina based plywood construction panels 10 and 30 according to the present invention. The weight savings here is a significant advantage, but not only for fuel savings but for the labor associated with moving these speakers into position and from venue to venue. The present invention has been well received by "roadies" tasked with rapidly moving these speakers.

The scope of the invention is not to be limited by the illustrative examples described above. The typical thickness of the present invention can vary from about 3/8" to 1 1/4" for most typical applications, but other thicknesses are possible. A wide variety of hardwood combinations can be used with the Paulowina panels 10 and 30 of the present invention. For example the panels form excellent bay window liners. The scope of the present invention is defined by the appended claims and equivalents thereto.

What is claimed is:

1. A plywood comprising plies of Paulowina wood combined with plys of other hardwoods.

2. The plywood according to claim 1 wherein the plywood is formed into a panel and the panel is a balanced panel.

3. The plywood according to claim 2 wherein the panel includes a center hardwood layer formed of a hardwood other than Paulowina.

4. The plywood according to claim 3 wherein a plurality of plies of Paulowina wood are positioned adjacent both sides of the center hardwood layer.

5. The plywood according to claim 4 wherein a top hardwood layer is formed of a hardwood other than Paulowina and is adjacent one of the plurality of layers of Paulowina wood and a lower hardwood layer is formed of a hardwood other than Paulowina and is adjacent the other of the plurality of layers of Paulowina wood.

6. The plywood according to claim 5 wherein the layers are coupled with an E-0 adhesive.

7. The plywood according to claim 6 wherein the center hardwood layer the top hardwood layer and the bottom hardwood layer is formed of poplar.

8. The plywood according to claim 3 wherein a single ply of Paulowina wood is positioned adjacent on each side of the center hardwood layer.

9. The plywood according to claim 8 wherein a top hardwood layer is formed of a hardwood other than Paulowina and is adjacent one of layers of Paulowina wood and a lower hardwood layer is formed of a hardwood other than Paulowina and is adjacent the other layer of Paulowina wood.

10. The plywood according to claim 9 wherein the layers are coupled with an E-0 adhesive.

11. The plywood according to claim 10 wherein the center hardwood layer the top hardwood layer and the bottom hardwood layer is formed of poplar.

12. The plywood according to claim 1 wherein the layers are coupled with an E-0 adhesive.

13. The plywood according to claim 12 wherein the hardwood layers include at least one layer that is formed of poplar.

14. The plywood according to claim 13 wherein the plywood is formed into a panel and the panel is a balanced panel.

15. The plywood according to claim 14 wherein the panel includes a center hardwood layer formed of a hardwood other than Paulowina.

16. A shipping container formed of wooden plywood panels, wherein the plywood comprises plies of Paulowina wood combined with plies of other hardwoods.

17. The shipping container according to claim 16 wherein the plywood panel is a balanced panel.

18. The shipping container according to claim 17 wherein the layers of the plywood panels are coupled with an E-0 adhesive.

19. The shipping container according to claim 18 wherein the hardwood layers of the plywood panels include at least one layer that is formed of poplar.

20. An enclosure for a vehicle trailer formed of wooden plywood panels, wherein the plywood comprises plies of Paulowina wood combined with plies of other hardwoods.

* * * * *